United States Patent
Zhang et al.

(10) Patent No.: US 9,003,419 B2
(45) Date of Patent: Apr. 7, 2015

(54) NETWORK BALANCING PROCEDURE THAT INCLUDES REDISTRIBUTING FLOWS ON ARCS INCIDENT ON A BATCH OF VERTICES

(75) Inventors: Bin Zhang, Fremont, CA (US); Meichun Hsu, Los Altos Hills, CA (US); Ren Wu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1651 days.

(21) Appl. No.: 12/512,246

(22) Filed: Jul. 30, 2009

(65) Prior Publication Data
US 2011/0029982 A1 Feb. 3, 2011

(51) Int. Cl.
G06F 9/46 (2006.01)
H04L 12/803 (2013.01)

(52) U.S. Cl.
CPC .................................. H04L 47/125 (2013.01)

(58) Field of Classification Search
None
See application file for complete search history.

(56) References Cited

U.S. PATENT DOCUMENTS

| | | | |
|---|---|---|---|
| 6,910,212 B2 * | 6/2005 | Brenner et al. | 718/104 |
| 7,216,348 B1 * | 5/2007 | deCarmo | 718/105 |
| 7,742,906 B2 * | 6/2010 | Zhou et al. | 703/13 |
| 7,761,444 B2 | 7/2010 | Zhang | |
| 7,827,305 B2 | 11/2010 | Zhang | |
| 8,533,016 B1 | 9/2013 | Zhang | |
| 2002/0198995 A1 * | 12/2002 | Liu et al. | 709/226 |
| 2005/0010675 A1 * | 1/2005 | Jaggi et al. | 709/232 |
| 2006/0291390 A1 | 12/2006 | Zhang et al. | |
| 2007/0076936 A1 * | 4/2007 | Li et al. | 382/129 |
| 2008/0071590 A1 | 3/2008 | Zhang et al. | |
| 2008/0218518 A1 | 9/2008 | Zhou et al. | |
| 2011/0029975 A1 | 2/2011 | Zhang | |

OTHER PUBLICATIONS

Delong et al. "A scalable graph-cut algorithm for ND grids." Computer Vision and Pattern Recognition, 2008. CVPR 2008. IEEE Conference on. IEEE, 2008.*
Zhang et al., U.S. Appl. No. 11/048,301, entitled "System and Method for Selecting a Portfolio," filed Jan. 30, 2005, pp. 1-22, Figs. 1-4.
Zhang et al., U.S. Appl. No. 11/340,081, entitled "Determining an Amount of Flow Through, or a Cut of, a Parameterized Network," pp. 1-23, Figs. 1-7.
Tarjan et al., U.S. Appl. No. 11/450,706, entitled "Identifying a Minimum Cut and/or a Maximum Flow Using Balancing of Vertex Excesses," filed Jun. 9, 2006, pp. 1-24, Figs. 1-5.
J.W.J. Williams, "Algorithm 232 Heapsort," Communications of the ACM, vol. 7, No. 6, pp. 347-349 (Jun. 1964).

(Continued)

Primary Examiner — Meng An
Assistant Examiner — James J Lee
(74) Attorney, Agent, or Firm — Trop, Pruner & Hu, P.C.

(57) ABSTRACT

A representation of a flow network having vertices connected by arcs is provided. The vertices include a first set of vertices that provide flow to a second set of vertices over arcs connecting the first set and second set of vertices. A balancing procedure in the network is performed that includes redistributing flows on arcs incident on the second set of vertices. The balancing procedure includes selecting a batch of the vertices in the second set, and redistributing flows on arcs incident on the selected batch of vertices. The selecting and redistributing are repeated for other batches of vertices in the second set.

14 Claims, 4 Drawing Sheets

(56) References Cited

OTHER PUBLICATIONS

J. Misra et al., "A Constructive Proof of Vizing' s Theorem," Information Processing Letters 41(3), pp. 131-133 (Sep. 1990).
A. Goldberg et al., "Beyond the Flow Decomposition Barrier," Journal of ACM, 45(5), pp. 783-797 (Sep. 1998).
B.V. Cherkassky et al., "On Implementing Push-Relabel Method for the Maximum Flow Problem," Algorithmica 19(4), pp. 390-410 (Sep. 1994).
D.D. Sleator et al., "A Data Structure for Dynamic Trees," Journal of Computer and System Sciences, vol. 26, No. 3, pp. 362-391 (Jun. 1983).
A.V. Goldberg et al., "A New Approach to the Maximum-Flow Problem," Journal of the Association for Computing Machinery, vol. 35, No. 4, pp. 921-940 (Oct. 1988).
A. Goldberg et al., "Finding Minimum-Cost Circulations by Successive Approximation," Mathematics of Operations Research, vol. 15, No. 3, pp. 430-465 (Aug. 1990).
D. Hochbaum, "The Pseudoflow Algorithm and the Pseudoflow-Based Simplex for the Maximum Flow Problem," Proceedings of 6th International Conference on Integer Programming and Combinatorial Optimization, pp. 325-337 (Jun. 1998).
http:\\magma.maths.usyd.edu.au/magma/htmlhelp/text1417.htm, "Maximum Flow and Minimum Cut," pp. 1-7 (at least as early as Nov. 17, 2005).
http:\\128.32.125.151/riot/Applications/WeightedMinCut/, "The Minimum/Maximum Cut Problem" pp. 1-3 (at least as early as Nov. 17, 2005).
http:\\mathworld.wolfram.com/MaximumFlowMinimumCut-Theorem.html., "Maximum Flow, Minimum Cut Theorem," p. 1 (at least as early as Nov. 27, 2005).
http:\\people.brunel.ac.uk/ mastjjb/jeb/or/netflow.html, "OR-Notes," pp. 1-14 (at least as early as Nov. 17, 2005).
http:\\mathworld.wolfram.com/NetworkFlow.html, "Network Flow," pp. 1-2 (at least as early as Nov. 17, 2005).
B. Zhang et al., "A Simultaneous Parametric Maximum-Flow Algorithm for Finding the Complete Chain of Solutions," pp. 1-15, Oct. 25, 2004.
B. Zhang et al., "Simultaneous Parametric Maximum Flow Algorithm with Vertex Balancing," pp. 1-8, Jun. 28, 2005.
B. Zhang et al., "A Simultaneous Maximum Flow Algorithm for the Selection Model," pp. 1-6, May 13, 2005.

\* cited by examiner

NETWORK BALANCING PROCEDURE THAT INCLUDES REDISTRIBUTING FLOWS ON ARCS INCIDENT ON A BATCH OF VERTICES

BACKGROUND

A network of nodes and edges that connect the nodes can be used to represent various types of systems, such as communications systems, hydraulic systems, transportation systems, and so forth, which involve flow of some type of quantity from node to node through conduits having specified capacities. A network can also represent the flow of monetary amounts between nodes that represent products or services, where the monetary amounts can represent profit, revenue, or expense. These networks can be analyzed for the purpose of solving an optimization problem, which involves finding the maximum flow between at least a source and at least a sink that are coupled by the nodes of the network. Such analysis involves identifying the "minimum cut" and/or the "maximum flow" through the network.

Conventionally, identifying the minimum cut of and/or the maximum flow through a network is often time consuming and computationally expensive, particularly when analyzing very large networks.

BRIEF DESCRIPTION OF THE DRAWINGS

Some embodiments of the invention are described with respect to the following figures.

DETAILED DESCRIPTION

Figure 1:
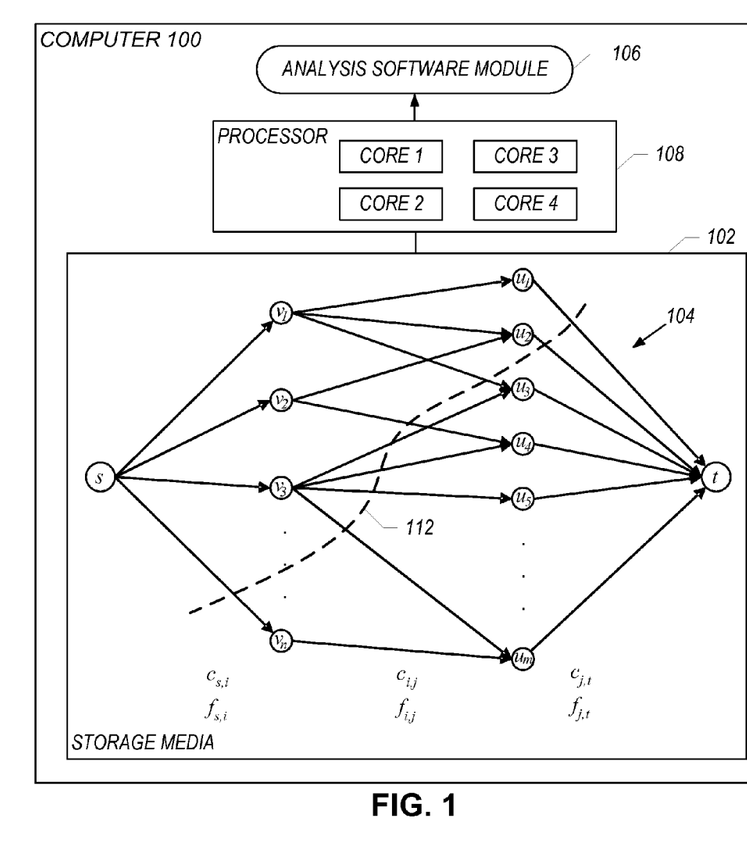
FIG. 1 is a block diagram of an example computer that stores a representation of an example network that may be analyzed according to some embodiments of the invention.

FIG. 1 is a block diagram of an example computer 100 that has storage media 102 (e.g., one or more disk-based storage devices and/or integrated circuit or semiconductor memory devices) for storing a representation of a flow network 104 (or more simply, network 104) having various vertices (represented by circles in FIG. 1). The vertices include a source vertex (s) a sink or target vertex (t), and intermediate vertices (v, u). The intermediate vertices include a first set of vertices (v) and a second set of vertices (u). The first set of vertices (v) include vertices $v_1, v_2, \ldots, v_n$ (n>1), and the second set of vertices (u) include $u_1, u_2, \ldots, u_m$ (m>1). Arcs connect the source vertex (s) to the first set of v-vertices, additional arcs connect the first set of v-vertices to the second set of u-vertices, and further arcs connect the second set of u-vertices to the target vertex (t).

The network 104 can represent various types of systems, including communications network systems, computer systems, transportation systems, hydraulic systems, communications systems, financial systems, projects, machines, crew scheduling systems, location and layout determination systems, warehouse and distribution systems, production planning and control systems, energy minimization or reduction systems, purchase order systems, and a parts requisitioning systems, and so forth. The network 104 can also be used in other applications including social, medical, or military applications.

The vertices in the network 104 represent various different types of network elements, such as processing elements, storage elements, switching or routing elements, financial elements, transportation elements, and so forth. Quantities (which can represent amounts of data or things; monetary amounts such as profit, revenue, and costs; amounts related to performance of services; and other amounts) flow from the source vertex s to the target vertex t through the intermediate vertices. The flow of quantities occur over conduits connecting the various vertices, where the conduits are represented as arcs in FIG. 1. Computations relating to network flows can be used for various applications, such as scheduling for transportation networks, routing of packets in the communications network, scheduling machinery and crew for construction projects, managing energy in a power network, identification of an optimal set of products to manufacture for sale, and so forth.

In the latter example above, the problem of identifying the optimal set of products to manufacture for sale is sometimes referred to as a revenue coverage optimization problem. In the revenue coverage optimization problem, each v-vertex represents a corresponding product that is being sold and each u-vertex represents sales transactions. In an alternative example, each v-vertex can represent a corresponding part that is to go into a product configuration, and each u-vertex represents a corresponding product configuration. Here, it is to be determined what parts to keep in the inventory given the product configurations, while maximizing revenue. The goal in this example is to pick the parts that cover the most product configurations.

Each arc from the source vertex s to a v-vertex has a capacity $c_{s,i}$. Moreover, a flow along a particular arc from the source vertex s to a v-vertex is represented as $f_{s,i}$.

Similarly, the capacities and flows over arcs from the v-vertices to the u-vertices are represented as $c_{i,j}$ and $f_{i,j}$, respectively. The capacities and flows from the u-vertices to the target vertex t are represented as $c_{j,t}$ and $f_{j,t}$, respectively.

In some embodiments, the network 104 of FIG. 1 is a "capacitated network." A "capacitated network" is represented by a directed graph G=(V, A) with two distinguished vertices, a source vertex s and sink vertex t, as depicted in FIG. 1, along with a non-negative "capacity function" c on the arcs in the set of arcs A. V represents the set of vertices, including the source and sink vertices as well as the intermediate vertices.

The network 104 depicted in FIG. 1 is referred to as a parametrically capacitated bipartite flow network with source vertex s and target vertex t, where $c_{s,i}=a_{s,i}\lambda$, and where $\lambda>0$ is a parameter. In FIG. 1, capacities $c_{i,j}$ and $c_{j,t}$ are non-negative constants. The flows $f_{s,i}$, $f_{i,j}$ and $f_{j,t}$ are non-negative flows that are bounded by their corresponding capacities.

The computer 100 also includes an analysis software module 106, which according to some embodiments performs flow balancing of the network 104 to allow the determination of a minimum cut and/or a maximum flow (from source to target). The analysis software module 106 is executable on a processor 108. In some implementations, the processor 108 is a multi-core processor having multiple cores (core 1, core 2, core 3, core 4). Alternatively, there can be multiple processors in the computer 100. As yet another example, the processor 108 can be a single-core processor.

A "cut" is a partition of the vertex set (V) (set of vertices in the graph G) into two parts, one containing source vertex s and the other containing target vertex t. A "source cut" is denoted by the set S of vertices in the part of the partition containing the source. An arc (v, w) with v but not w in S "crosses" the source cut S. The capacity of a source cut S is $\Sigma\{c(v, w)|(v, w)$ is an arc crossing S$\}$; in which c(v, w) represents the capacity of an arc (v, w). A cut is minimum if it has minimum capacity. The minimum cut problem is that of finding a minimum cut in a given network.

An example dashed line (dividing line) 112 in FIG. 1 illustrates a minimum cut. As depicted in FIG. 1, the dividing line 112 separates the source vertex s from the sink vertex t. The dividing line 112 divides the vertices in the network into two sets, a first set (the source cut) that includes the source vertex s, and a second set that includes the sink vertex t. A minimum cut is a cut of minimum capacity; in other words, the sum of capacities of arcs crossing the cut is minimum among all cuts.

The classic maximum-flow minimum-cut theorem states that the value of any flow is no greater than the capacity of any cut, and the value of a maximum flow equals the capacity of a minimum cut. In the capacitated flow-network in FIG. 1, the maximum flow is a piece-wise linear function of $\lambda$ and the bending points, where the slope of the line changes, are at the $\lambda$ values where the minimum cut changes. These bending points are called break points of the parameter $\lambda$. If the maximum flows at all the break-points are identified, the complete maximum flow function is found. The vertex balancing procedure according to some embodiments is used to find the maximum flow at all break points.

Figure 2:
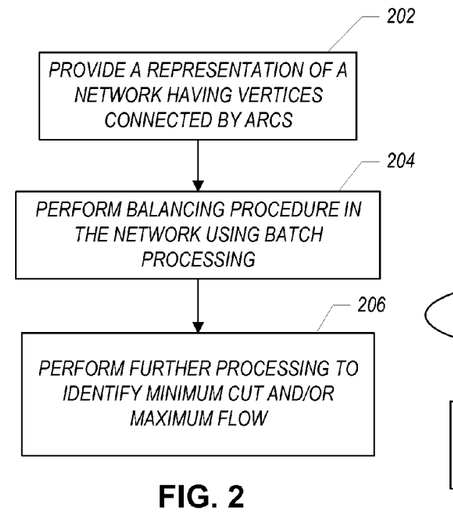
FIG. 2 is a flow diagram of a process according to an embodiment.

FIG. 2 is a general flow diagram of a process according to an embodiment. The process of FIG. 2 can be performed by the analysis software module 106 of FIG. 1. A representation of a network, such as network 104, is provided (at 202), where the network 104 has vertices connected by arcs. As discussed above, the vertices include a source vertex, a target vertex, and intermediate vertices including a first set of vertices (v-vertices) and a second set of vertices (u-vertices). Arcs connect the various vertices in the network 104, where the arcs represent conduits of flows of quantities among the vertices.

Next, a balancing procedure is performed (at 204) in the network using batch processing according to an embodiment. Batch processing refers to a balancing procedure in which flows on arcs incident on the second set of vertices (u-vertices) are redistributed by selecting a batch of vertices in the second set, and performing the redistribution of flow on the arcs incident on the u-vertices in the selected batch. The flow redistribution is iteratively performed on different batches of u-vertices until the network is balanced. Flow redistribution causes the flow network to be balanced.

Next, further processing is performed (at 206) to identify a minimum cut and/or a maximum flow. Note that if the balancing procedure stops and there are no further possible balancing moves in the network, then a sequence of minimum cuts of the parametric flow-network have been found at all break points of the parameter $\lambda$. Obtaining a maximum flow based on the minimum cut is straightforward.

Figure 3:
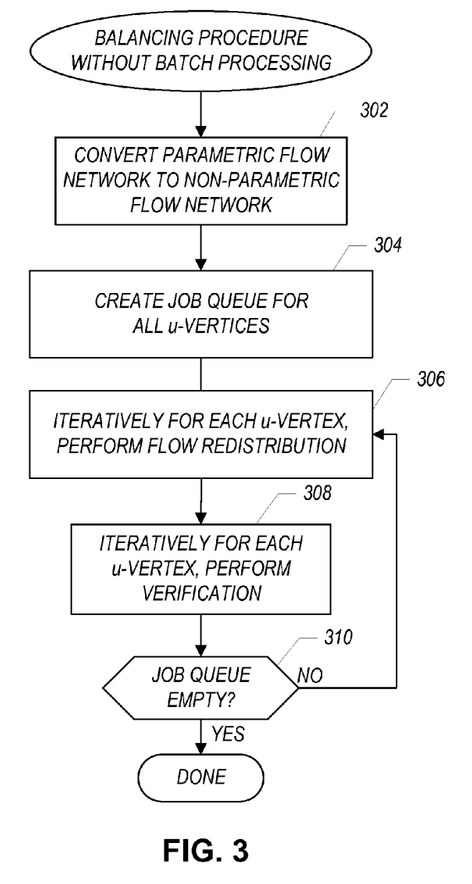
FIG. 3 is a flow diagram of a balancing procedure without using batch processing according to an embodiment.

FIG. 3 shows a balancing procedure without using batch processing. FIG. 3 is provided to allow a better understanding of a balancing procedure that employs batch processing according to an embodiment, as described further below. The following algorithm can be modified to work with general positive coefficients $a_{s,i}$, i=1,...,n. But for simplicity, the case of $a_{s,i}=1$ is discussed.

First, the parametric flow network 104 is converted (at 302) to a non-parametric flow network by setting all the capacities $c_{s,i}$ (from source vertex s to v-vertices) to positive infinity. The maximum flow is determined for this non-parametric flow-network.

Next, a job queue (Q) is created (at 304) for storing all u-vertices of the network. This is the job queue from which u-vertices are extracted one at a time (when batch processing is not used) for the purpose of redistribution of flow for performing the network balancing procedure. All flows between the u-vertices are set as follows: $f_{j,t}=c_{j,t}$ for j=1,...,m. A u-vertex is retrieved (and removed) from the head of the queue (Q), while a u-vertex is inserted as a member into the tail of the queue (Q). The queuing scheduling does not have to employ FIFO (first-in-first-out). Other queuing scheduling algorithms can also allowed here, as long as no u-vertices is starved (the probability of processing any u-vertex in the queue in the future is strictly positive).

Next, iteratively for each u-vertex, flow redistribution is performed (at 306). The flow redistribution redistributes the flows on the arcs incident on the corresponding u-vertex. The total flow on the arc from the u-vertex to the target vertex t will not be changed by the flow redistribution. If the flows on the arcs incident to the processed u-vertex are changed by performing the flow redistribution, then the processed u-vertex is placed back into the job queue to be processed again in the future. On the other hand, if the flows on the arcs incident to the u-vertex being processed did not change due to the flow redistribution, then the processed u-vertex is left out of the job queue and deactivated. The task 306 is repeated until the job queue (Q) is empty—in other words, all the u-vertices have become deactivated.

Next, sequentially for each u-vertex, verification is performed (at 308). The verification procedure is the same as the flow redistribution procedure of 306, and the verification procedure is performed to see if any flow on the arcs incident to the u-vertex will change. If any of the flows change, then the verification procedure is considered as failed on that u-vertex, and the corresponding u-vertex for which flows on the arcs incident to such u-vertex have changed is placed back into the job queue for further processing.

After the verification procedure has been performed for each u-vertex, the procedure next determines (at 310) if the job queue is empty. If not, then tasks 306 and 308 are repeated. On the other hand, if the job queue is empty, then the balancing procedure is considered to be done.

Figure 4:
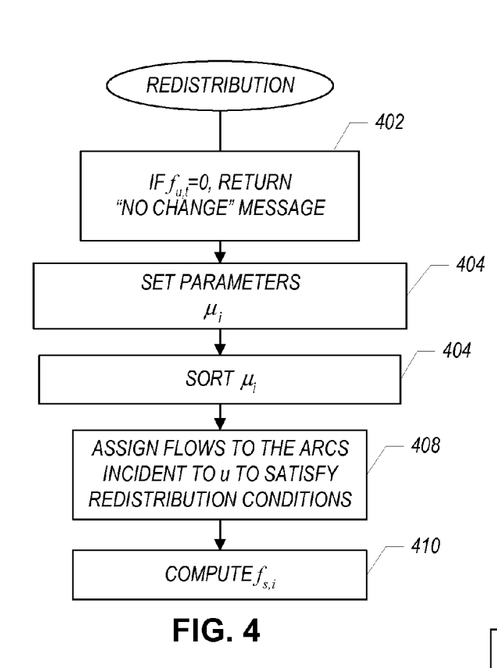
FIG. 4 is a flow diagram of a flow redistribution procedure that does not employ batch processing according to an embodiment.

The redistribution procedure without batch processing is shown in FIG. 4. Without loss of generality, assume that $\{v_i|i=1,...,K\}$, where K≥1, are all the vertices incident to u. If $f_{u,t}=0$, there is no flow to be distributed, the redistribution procedure returns (at 402) with the message "no change" so that the vertex u will be deactivated.

It is assumed that $f_{u,t}>0$ (the flow from vertex u to the target vertex t is greater zero). The redistribution procedure next sets (at 404) $\mu_i=f_{s,i}-f_{i,u}$, i=1,...,K, where $\mu_i$ is the remaining flow on the arc from source s to vertex $v_i$ which will not flow into node u (in other words, $\mu_i$ is the flow from source s to vertex $v_i$ that flows to the other u-vertexes other than vertex u under consideration).

Next, the redistribution sorts (at 406) $\{\mu_i|i=1,...,K\}$. For simplicity, it is assumed that $\mu_1 \leq \mu_2 \leq ... \leq \mu_K$.

Next flows are assigned (at 408) to the arcs incident to u to satisfy the following redistribution conditions:

$$\mu_1 + f_{1,u} = \ldots = \mu_{K'} + f_{K',u} \le \mu_{K'+1} \le \ldots \le \mu_K,$$

$$f_{i,u} = 0 \text{ for } i = K' + 1, \ldots, K \text{ and } \sum_{i=1}^{K'} f_{i,u} = f_{u,t}.$$

Note that the values of $f_{s,i}$ are used to update $f_{i,u}$.

Once the new flows $f_{i,u}$ have been computed in task 408, the flows between the source vertex s and the v-vertices are updated (at 410) as follows:

$$f_{s,i} = \mu_i + f_{i,u}, \text{ for } i=1, \ldots, K.$$

After the redistribution at a u-vertex, the state of the flows on all the arcs incident to the u-vertex is called balanced (even though this balance may be broken by the future flow redistribution at other u-vertices) because no positive flow augmentation along a (simple) path s→v'→u→v''→s with $f_{s,v'} < f_{s,v''}$ is possible. It is also proven that each flow-redistribution causes a positive function to decrease. Therefore, the convergence to a balanced state at all u-vertices will be reached.

The verification procedure of task 308 in FIG. 3 is the same as the redistribution procedure depicted in FIG. 4.

In accordance with some embodiments, to improve the performance of the balancing procedure depicted in FIG. 3, batch processing can be applied when performing the balancing procedure. Batch processing refers to selecting a batch of u-vertices to perform flow redistribution, rather than performing the flow redistribution for each u-vertex one at a time, as shown in FIG. 3. A flow redistribution procedure in which batch processing is employed is referred to as a batch flow redistribution procedure.

By being able to select a batch of u-vertices at one time for performing flow redistribution, performance can be enhanced if the balancing procedure is performed in a multiprocessing system, such as that shown in FIG. 1. However, even if batch processing is performed in a uni-processing environment (with one single-core processor), the batch flow redistribution procedure can still provide enhanced performance.

Figure 5:
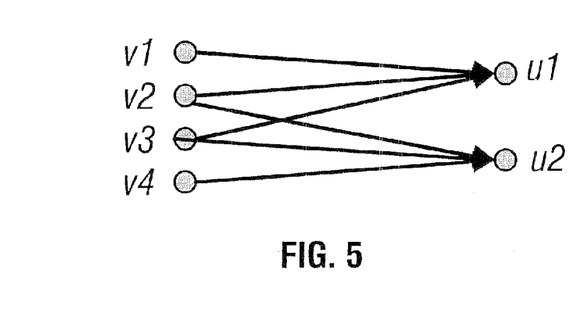
FIG. 5 illustrates a portion of a network that can be processed using a balancing procedure according to an embodiment.

Performing flow redistribution on a batch of u-vertices concurrently presents a synchronization issue. As shown in FIG. 5, two different u-vertices u1 and u2 may share some v-vertices (e.g., v1, v2, v3, v4)—in other words, flow occurs from the vertices v1, v2, v3, v4 to the vertices u1 and u2. In this scenario, the computations performed by the flow redistribution procedure depicted in FIG. 4 are not independent-in other words, the flow redistribution procedures for u1 and u2 cannot simply be executed on separate processor cores (or separate processors) without performing synchronization.

Recall that the flow redistribution procedure shown in FIG. 4 reads flow values $f_{s,i}$ and $f_{i,u}$ at task 404. Recall also that the values of $f_{s,i}$ are updated (written) at 410 based on updated values of $f_{i,u}$. If multiple flow redistribution procedures (multiple threads) are performed in parallel, then it may be possible that a first one of the threads has updated (written) $f_{s,i}$ values before a second one of the threads has completed the reading of $f_{s,i}$ values. If this occurs, the second thread would be reading incorrect $f_{s,i}$ values (the updated values rather than the original values).

Figure 6:
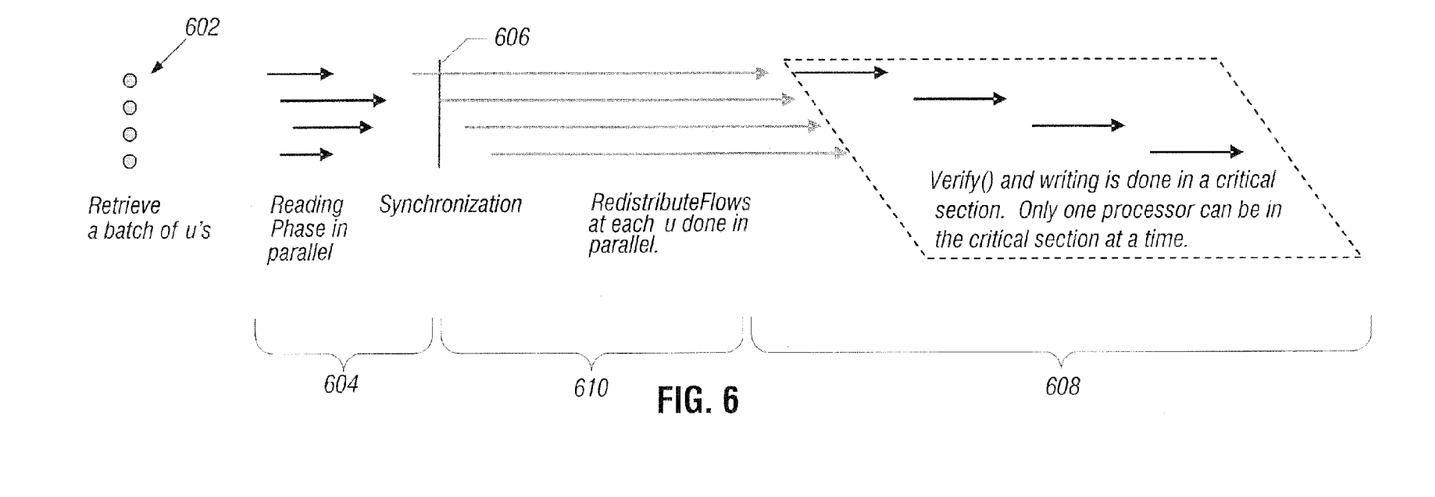
FIG. 6 illustrates an example of a balancing procedure with batch processing according to an embodiment.

To address this, synchronization is performed between multiple flow redistribution threads such that each of the flow redistribution threads read consistent data. FIG. 6 shows an example of batch processing in which a batch (602) of four u-vertices are processed concurrently in the batch redistribution procedure. The reading phase 604 can proceed concurrently among the four threads, where the reading phase involves reading the $f_{s,i}$ values. A synchronization point 606 is identified (represented by a vertical line in FIG. 6), where the synchronization point can be any point between the end of the reading phase 604 and the start of a "critical section" 608. The critical section includes the writing phase (where $f_{s,i}$ values are updated) as well as a portion of the verification procedure that involves pushing u-vertices that have failed the verification procedure back to the job queue. Between the reading phase 604 and the critical section 608, another phase 606 of the batch redistribution procedure can proceed concurrently among the threads, where the phase 606 is the flow redistribution phase in which the new flows to the u-vertices in the batch 602 are computed. However, the write of the $f_{s,i}$ values are not performed until all reads have completed, as indicated by the synchronization point 606.

The synchronization point 606 can be invoked by using a Synchronize primitive, which prevents code corresponding to the critical section 608 from starting until all batch flow redistribution threads (associated with the batch of u-vertices) have completed the reading phase 604.

Instead of using Synchronize primitive, two separate primitives Mark and AfterAll can be used instead. Each of the multiple threads executing in a computer system is considered to have multiple task sections. The point in a thread at which the Mark primitive is called is referred to as a marked point, which occurs after a first task section in the corresponding batch flow redistribution thread corresponding to the reading phase 604. The AfterAll primitive can be called before the start of a second of the task sections of each thread (corresponding to the critical section 608) such that the second task section cannot begin until the marked point of each thread has been reached. The AfterAll primitive can be considered to indicate a synchronization point that is related to the marked point. Further details regarding the Mark primitive and AfterAll primitive are provided in U.S. Patent Application entitled "Synchronizing a Plurality of Threads," filed concurrently herewith (Attorney Docket No. 200902477-1).

To improve performance, in the time between the marked point marked by the Mark primitive and the synchronization point at the beginning of the second task section, another task section associated with each batch flow redistribution thread is allowed to execute. By performing this other task section (calculation of new flows incident on the batch of u-vertices under consideration) between the marked point and the synchronization point, efficiency can be improved since at least some parts of the threads are allowed to continue to process while the second task sections of the threads are waiting for completion of the first task sections of all threads that are involved in the synchronization process.

Figure 7:
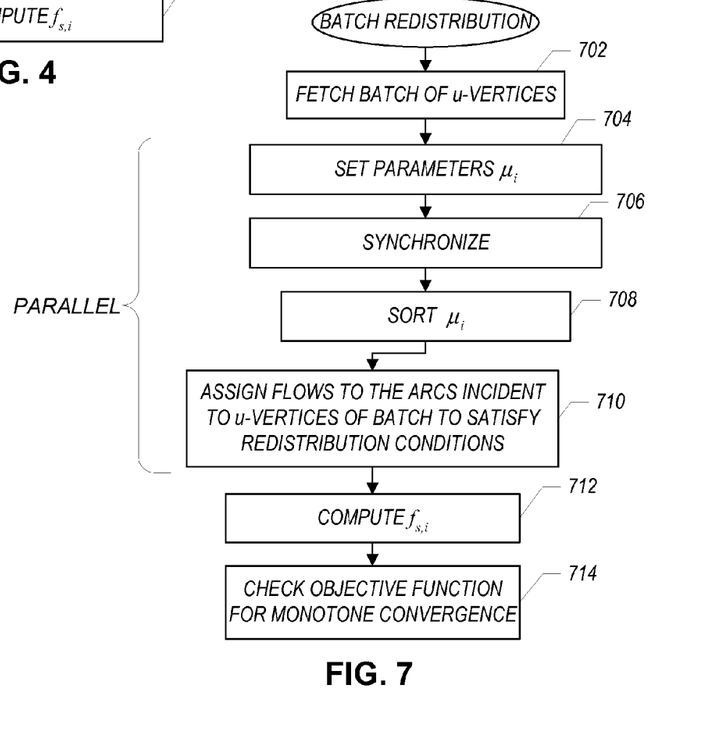
FIG. 7 is a flow diagram of a flow redistribution procedure that employs batch processing according to an embodiment.

The batch flow redistribution procedure is shown in FIG. 7. First, a batch of u-vertices is fetched (at 702). This batch of u-vertices can be fetched from the job queue (Q) referred to in connection with FIG. 3. Next, the batch flow redistribution procedure performs the following processes in parallel: 704, 706, 708, and 710—in other words, multiple batch flow redistribution threads for the corresponding u-vertices of the batch are executed concurrently. The batch flow redistribution procedure sets (at 704) the parameters $\mu_i = f_{s,i} - f_{i,u}$, i=1, . . . ,K, which is the reading phase. Next, the batch flow redistribution procedure calls a Synchronize primitive (at 706), which defines a synchronization point that has to be reached by all the parallel batch flow redistribution threads before the critical section (608 in FIG. 6) can proceed. Alternatively, instead of using the Synchronize primitive, the Mark and AfterAll primitives can be used instead, as discussed above.

Next, the procedure sorts (at 708) $\mu_r$ values $\{\mu_i | i=1, \ldots, K\}$. For simplicity, it is assumed that $\mu_1 \leq \mu_2 \leq \ldots \leq \mu_K$.

Next, new flows are assigned (at 710) to the arcs incident to the u-vertices in the batch to satisfy redistribution conditions, similar to that discussed above in connection with task 408 of FIG. 4. However, writing the results back to the arcs to compute $f_{s,i}$ is performed sequentially (at 712).

Next, the objective function is checked (at 714) for monotone convergence. The objective function is expressed as $$obj = \sum_{i=1}^{n} f_{s,i}^2.$$

The result of the batch flow redistribution procedure is committed only if it reduces the value of the objective function. Committing the result of the batch flow redistribution procedure means that the result is written to persistent storage media to replace previous values, such as values of the flows $f_{s,i}$. If monotone convergence is not present, then the result from the redistribution of this particular u-vertex is disregarded. No change is made on the previous $f_{i,u}$ values.

Note that the verification procedure of the balancing procedure can also be made to be performed in parallel. The part of the verification procedure that involves a write is when the verification procedure pushes a u-vertex that has failed the test of the verification procedure back into the job queue. Pushing the u-vertex back to the job queue can also be performed sequentially as part of the critical section identified as 608 in FIG. 6.

Although the batch flow redistribution procedure shown in FIG. 7 has relatively high performance when executed in a multiprocessing system, it is noted that the batch flow redistribution procedure can also be executed in a uni-processing environment. Even when executed in the uni-processing environment, the batch flow redistribution procedure has been shown to exhibit faster processing time compared to the serial mode flow redistribution procedure of FIG. 4.

By employing a balancing procedure that employs a batch flow redistribution procedure, the balancing procedure can be performed faster as compared to traditional techniques. This allows the finding of a maximum flow and/or minimum cut of a flow network to be performed in a faster manner.

Instructions of software described above (including the analysis software module 106 FIG. 1) are loaded for execution on a processor (such as processor 108 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   providing a representation of a flow network comprising a first set of vertices that provide flow to a second set of vertices over arcs connecting the first set and second set of vertices;
   performing, by a computer system, a balancing procedure in the flow network that includes redistributing flows on arcs incident on the second set of vertices, wherein the balancing procedure comprises:
   selecting a batch of the vertices in the second set;
   redistributing flows on arcs incident on the selected batch of vertices, wherein the redistributing comprises:
      reading flows incident on at least a portion of the first set of vertices;
      using the flows incident on the at least the portion of the first set of vertices to update the flows on the arcs incident on the selected batch of vertices; and
      updating at least some of the flows incident on the at least the portion of the first set of vertices in response to the updated flows on the arcs incident on the selected batch of vertices,
      wherein the reading, using, and updating are performed by plural threads executing in the computer system;
   repeating the selecting and redistributing for other batches of vertices in the second set; and
   establishing synchronization to prevent the updating of the at least some of the flows incident on the at least the portion of the first set of vertices from being performed by any of the plural threads until each of the threads has completed the reading.

2. The method of claim 1, wherein redistributing the flows on the arcs incident on the selected batch of vertices comprises redistributing the flows in parallel by the plural threads for the selected batch of vertices.

3. The method of claim 2, wherein redistributing the flows in parallel comprises redistributing the flows in parallel in a multiprocessing system.

4. The method of claim 1, wherein a number of the plural threads is equal to a number of the vertices in the selected batch.

5. The method of claim 1, further comprising executing the plural threads in one of a uni-processor environment and a multiprocessing environment.

6. The method of claim 1, wherein the balancing procedure further comprises:
performing a verification procedure to ensure that further redistribution of flows does not have to be performed on any of the arcs incident on the selected batch of vertices.

7. The method of claim 6, wherein the balancing procedure further comprises:
in response to the verification procedure detecting a failure for a given vertex of the vertices of the selected batch, placing the given vertex back into a queue to further perform flow redistribution.

8. The method of claim 1, wherein the flows incident on the at least the portion of the first set of vertices comprise flows from a source to the at least the portion of the first set of vertices, and the flows on the arcs incident on the selected batch of vertices comprise flows from vertices in the first set to the selected batch of vertices in the second set.

9. A computer system comprising:
a storage media to store a representation of a flow network comprising a first set of vertices that provide flow to a second set of vertices over arcs connecting the first set and second set of vertices; and
one or more processors to:
select a batch of the vertices from the second set;
redistribute flows on arcs incident on the selected batch of vertices, wherein the redistributing is performed by a plurality of threads corresponding to the respective vertices of the selected batch, wherein the redistributing comprises:
reading flows incident on at least a portion of the first set of vertices;
using the flows incident on the at least the portion of the first set of vertices to update the flows on the arcs incident on the selected batch of vertices; and
updating at least some of the flows incident on the at least the portion of the first set of vertices in response to the updated flows on the arcs incident on the selected batch of vertices;
repeat the selecting and redistributing until flow in the flow network is balanced; and
perform synchronization to ensure that all of the plurality of threads have completed the reading before the updating by any of the plurality of threads is started.

10. The computer system of claim 9, wherein the one or more processors are configured to perform determining of one or more a minimum cut and a maximum flow of the flow network.

11. The computer system of claim 9, wherein the flow network represents a system selected from among a communications network system, a computer system, a hydraulic system, a machine, and an energy reduction system.

12. The computer system of claim 9, wherein the one or more processors include either multiple processors or a processor with multiple cores, and wherein the plurality of threads are executable on the multiple processors or multiple cores.

13. The computer system of claim 9, wherein the redistributing further comprises:
checking for monotone convergence of an objective function based on the flows incident on the at least the portion of the first set of vertices after the updating is performed; and
in response to detecting that the monotone convergence is not satisfied, rejecting a result of the redistributing.

14. An article comprising at least one non-transitory computer-readable storage medium containing instructions that upon execution cause a computer system to:
provide a representation of a flow network comprising a first set of vertices that provide flow to a second set of vertices of the flow network over arcs connecting the first set and second set of vertices;
perform, in parallel, flow redistribution on arcs incident on a selected batch of vertices in the second set, wherein performing the flow redistribution comprises:
reading flows incident on at least a portion of the first set of vertices;
using the flows incident on the at least the portion of the first set of vertices to update flows on the arcs incident on the selected batch of vertices; and
updating at least some of the flows incident on the at least the portion of the first set of vertices in response to the updated flows on the arcs incident on the selected batch of vertices;
iteratively select different batches of vertices in the second set and reiterating the flow redistribution on each of the iteratively selected batch of vertices for balancing the flow network,
wherein performing the flow redistribution is performed by a plurality of threads for corresponding vertices of each selected batch; and
perform synchronization to ensure that a reading phase in the flow redistribution is completed by each of the plurality of threads before a writing phase in the flow redistribution is begun by any of the plurality of threads.

* * * * *

UNITED STATES PATENT AND TRADEMARK OFFICE
CERTIFICATE OF CORRECTION

PATENT NO.       : 9,003,419 B2
APPLICATION NO.  : 12/512246
DATED            : April 7, 2015
INVENTOR(S)      : Bin Zhang et al.

It is certified that error appears in the above-identified patent and that said Letters Patent is hereby corrected as shown below:

In the Drawings

In sheet 3 of 4, (Second Occurrence) of reference numeral 404, line 1, delete "404" and insert -- 406 --, therefor.

Signed and Sealed this
Eighteenth Day of August, 2015

Michelle K. Lee
*Director of the United States Patent and Trademark Office*